United States Patent [19]

Repetto

[11] 4,103,081

[45] Jul. 25, 1978

[54] STABILIZED ANAEROBIC ADHESIVES

[75] Inventor: Stephen Repetto, Vernon, Conn.

[73] Assignee: Loctite Corporation, Newington, Conn.

[21] Appl. No.: 720,458

[22] Filed: Sep. 3, 1976

[51] Int. Cl.$^2$ .......................................... C08F 120/20
[52] U.S. Cl. ................................ 526/323.1; 424/349; 428/463; 526/220; 526/292; 526/320
[58] Field of Search ............... 526/220, 292, 320, 328, 526/323.1

[56] References Cited

U.S. PATENT DOCUMENTS

| 3,682,875 | 8/1972 | O'Sullivan et al. | 526/220 |
| 3,987,234 | 10/1976 | Gruber et al. | 526/328 |
| 3,988,507 | 10/1976 | Gruber et al. | 526/328 |
| 3,991,261 | 11/1976 | Gruber et al. | 526/328 |

OTHER PUBLICATIONS

Chem. Abs., 8th Collective Index, vols. 66-75, (Subject: Amino-Benzimidazolid), (1967-1971), pp. 3698S-3699S.

Primary Examiner—Harry Wong, Jr.
Attorney, Agent, or Firm—Eugene F. Miller; Jean B. Mauro

[57] ABSTRACT

A curable anaerobic adhesive composition is provided in which a nitrobenzene, particularly a chlorinated nitrobenzene, is incorporated as a stabilizer. The nitrobenzene stabilizer is particularly useful in anaerobic compositions having polyethylene glycol dimethacrylate as a basic polymerizable monomer.

7 Claims, No Drawings

STABILIZED ANAEROBIC ADHESIVES

BACKGROUND OF THE INVENTION

The present invention is related generally to stabilized anaerobic adhesive compositions and is more particularly concerned with a novel composition in which a nitrobenzene is used as a stabilizer.

Anaerobic adhesive systems are those which are stable in the presence of oxygen, but which polymerize in the absence of oxygen. Polymerization is initiated by the presence of a peroxy compound. The cured, cross-linked resins serve as sealants and as adhesives.

Typically, resin monomers are terminated with polymerizable acrylate esters such as methacrylate, ethacrylate and chloracrylate esters, (e.g., polyethylene glycol dimethacrylate and urethane-acrylates (e.g., U.S. Pat. No. 3,425,988) derived according to known urethane chemistry). The other ingredients typically present are an initiator, preferably an organic hydroperoxide such as cumene hydroperoxide, tertiary butyl hydroperoxide and the like. There is also normally provided a stabilizer against free radical initiation, such as a quinone or hydroquinone, in an amount sufficient to prevent premature polymerization of the adhesive due to decomposition of the peroxy compound. There are also preferably present one or more accelerators which are preferably nitrogen-containing compounds such as tertiary amines, imides, sulfamides and the like which promote the rate of cure.

Cure is accelerated by the presence of a suitable metal, such as a transition metal, or its ion.

An anaerobic adhesive is applied to one or both of the surfaces to be joined. When the two surfaces are joined and oxygen excluded, cure is initiated. As is well known, surfaces such as glass may require the application of a suitable accelerator such as a transition metal compound, which increases the rate of cure upon the substantial exclusion of oxygen or air.

Anaerobic adhesives have been well documented in the art as for instance, in U.S. Pat. Nos. 2,895,950; 3,041,322; 3,043,820; 3,203,941; 3,218,305; 3,300,547; 3,435,012, 3,547,851, 3,625,875 and 3,046,262, the disclosures of which are incorporated herein by reference.

Anaerobic adhesive systems are typically supplied from a water-like liquid to a light-weight grease in consistency. One end-use application is to apply the adhesive to the threads of a bolt or mating nut which are then assembled. The adhesive fills the spaces between the threads thereby excluding oxygen and enabling cure. In the normal situation, the metals present in the bolt or the nut accelerate cure.

In spite of the high degree of success that such anaerobic adhesive systems have achieved in the marketplace, a continuing effort is going forward to provide better and/or alternative systems and components therefor. One area of particular interest is the selection of stabilizers as these components determine to a large extent the shelf-life of the product.

SUMMARY OF THE INVENTION

Accordingly, it is an object of the invention to provide a novel curable anaerobic adhesive composition which has excellent stability characteristics.

It is a second object of the invention to provide such an anaerobic adhesive composition which is also protected against fungus.

Briefly, the invention in its broadest aspects is an anaerobic adhesive composition which includes a polyacrylate ester monomer having the following general formula:

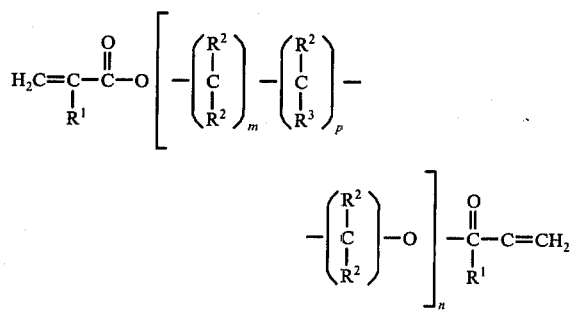

wherein $R^2$ represents a radical selected from the group consisting of hydrogen, lower alkyl of from 1 to about 4 carbon atoms, hydroxy alkyl of from 1 to about 4 carbon atoms, and

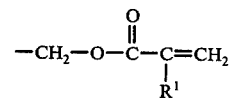

$R^1$ is a radical selected from the group consisting of hydrogen, halogen, and lower alkyl of from 1 to about 4 carbon atoms; $R^3$ is a radical selected from the group consisting of hydrogen, hydroxyl, and

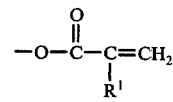

$m$ is an integer equal to at least 1, e.g., from 1 to about 15 or higher, and preferably from 1 to about 8; $n$ is an integer equal to at least 1, e.g., 1 to about 40 or more, and preferably between about 2 and about 10; and $p$ is 0 or 1. A stabilizer is provided which is a nitrobenzene having from zero to five substituent groups thereon, which groups are selected from chlorine, bromine and methyl. A suitable accelerator is included. Finally, a suitable free radical initiator is included in an amount sufficient to initiate polymerization of the monomer.

Further objects, advantages and features of the invention will be apparent from the following detailed description of the invention.

DETAILED DESCRIPTION OF THE PREFERRED EMBODIMENTS

The present invention is applicable to those curable anaerobic adhesive systems having as the monomer therein polyacrylate esters which have the following general formula:

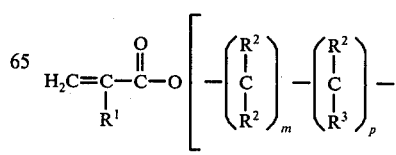

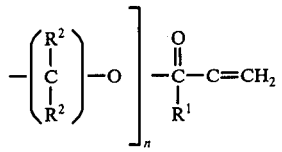

where $R^2$ represents a radical selected from the group consisting of hydrogen, lower alkyl of from 1 to about 4 carbon atoms, hydroxy alkyl of from 1 to about 4 carbon atoms, and

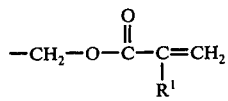

$R^1$ is a radical selected from the group consisting of hydrogen, halogen, and lower alkyl of from 1 to 4 carbon atoms; $R^3$ is a radical selected from the group consisting of hydrogen, hydroxyl, and

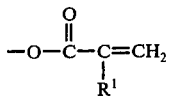

$m$ is an integer equal to at least 1, e.g., from 1 to about 15 or higher, and preferably from 1 to about 8; $n$ is an integer equal to at least 1, e.g., 1 to about 40 or more, and preferably between about 2 and about 10; and $p$ is 0 or 1.

Typical examples of polyacrylate esters corresponding to the above general formula are di-, tri- and tetraethyleneglycol dimethacrylate; di-(pentamethyleneglycol) dimethacrylate; tetraethyleneglycol diacrylate; tetraethyleneglycol di (chloroacrylate); diglycerol diacrylate; diglycerol tetramethacrylate; butyleneglycol dimethacrylate; neopentylglycol diacrylate; and trimethylolpropane triacrylate.

Any suitable one of the accelerators conventional in the art for use with such polyacrylate monomers may be used in the practice of the present invention. These include nitrogen containing compounds. As accelerators there may be mentioned liquid and solid organo-nitrogen compounds including but not limited to organic amides such as formamide, succinimide and the like; tertiary amines such as tributylamine, triethylamine, hexamethyl pararosaniline and the like; aromatic tertiary amines such as dimethyl paratoluidine and the like; organic sulfimides such as benzoyl sulfimide and the like; as well as mixtures thereof. Normally solid organo-nitrogen compounds are particularly preferred as they have the least effect on the viscosity of the resulting composition as well as the least tendency to migrate from the composition.

A suitable free radical initiator is incorporated in an amount sufficient to initiate polymerization of the monomer. Preferably, the initiator is a peroxy compound including the hydroperoxides, preferably organic hydroperoxides of the formula $R^4OOH$, wherein $R^4$ is generally a hydrocarbon radical containing up to about 18 carbon atoms, preferably an alkyl, aryl or aralkyl radical containing from 1 to about 12 carbon atoms. Typical examples are cumene hydroperoxide, methyl ethyl ketone hydroperoxide and the like.

According to the present invention, the stabilizer which is incorporated at least includes a nitrobenzene having from zero to five, preferably one to five, substituent groups thereon selected from chlorine, bromine and methyl, and one to two, preferably one, nitro groups. Chlorinated nitrobenzenes are preferred and typical ones are 2,3,5,6 tetrachloronitrobenzene, pentachloronitrobenzene and 2,6-dichloro-4-nitroaniline. The nitrobenzene stabilizer may be incorporated in any functional amount up to the solubility limit in the case of a solid nitrobenzene derivative. However, performance as a stabilizer should not be substantially interfered with. Preferably the stabilizer should be incorporated in an amount ranging from about 0.05 percent by weight to about 1.5 percent by weight and is more preferably present in an amount ranging from 0.1 to 1.0 percent by weight.

The nitrobenzene stabilizers may be incorporated in addition to other stabilizers, such as quinone and derivatives thereof, such as hydroquinone, the percentage inclusion of the nitrobenzene being in the aforementioned range. The additional stabilizers, if present, are in an amount in the range from about 1 to about 200ppm.

Chlorinated nitrobenzene compounds such as are found in the present invention have found earlier utility in other chemical systems as fungicides and also perform that function in the formulations of the present invention as well, thereby negating the need for an additional component where that protection is required, such as in military applications.

The foregoing will now be further illustrated through the use of examples.

EXAMPLES

An standard anaerobic adhesive formulation was prepared having the following general composition by weight:

93.4% - polyethylene glycol dimethacrylate
1.6% - saccharin (accelerator)
0.67% - diethyl-p-toluidene (accelerator)
0.33% - dimethyl-o-toluidene (accelerator)
1% - nitrobenzene (stabilizer)
3% - cumene hydroperoxide (initiator)

After preparation the various formulations were tested for stability at 82° C and for cure speed on steel nuts and bolts. The results are as shown in the table below.

The stability test is an accelerated aging test performed by placing the samples of the adhesive compositions in glass tubes in a water bath at 82° C. The tubes are checked frequently for gellation and the time at which gellation occurred is recorded. In this test a non-gellation period of about 60 minutes typically corresponds to a room temperature shelf life of about one year, and, of course, a longer non-gellation period is highly desirable and is indicative of the effectiveness of the stabilizer.

In the other performance test, several drops of the adhesive compositions are placed on the threads of a sheet, 3/8-16 bolt and the mating nut is then wound on loosely to engage the threads containing the adhesive. After various periods of cure time, two unwinding torque measurements were made: "break" strength—the torque required to cause the first relative motion between the nut and bolt; and "prevail" strength—the torque required to cause rotation of the nut 180° beyond the "break" point.

TABLE

| Stabilizer | Stability (hrs.) | Speed(break/prevail, in-lb) | | | |
|---|---|---|---|---|---|
| | | 15' | 30' | 1 hr. | 2 hrs. |
| Pentachloro-nitrobenzene | 4+ | 30/122 | 63/303 | 47/296 | 43/348 |
| 4-chloronitro-benzene | 4+ | 37/177 | 30/228 | 50/277 | 52/254 |
| Nitrobenzene | 4+ | 37/272 | 27/242 | 33/303 | 56/253 |

Formulations were also prepared having 0.1 percent by weight of the various stabilizers, all other ingredients being in the same relative proportions. Similar test results were obtained.

The same formulation was prepared incorporating O-dichlorobenzene. The stability test resulted in gellation in approximately 7 minutes. Therefore, the presence of at least one nitro group is required.

While there have been described what are considered to be preferred embodiments of the present invention, it will be obvious to those skilled in the art that various changes and modifications may be made therein; such as addition of other components, e.g., tackifiers, without departing from the spirit of the invention.

What is claimed is:

1. An anaerobic adhesive system comprising
    (a) a polyacrylate monomer of the following general formula:

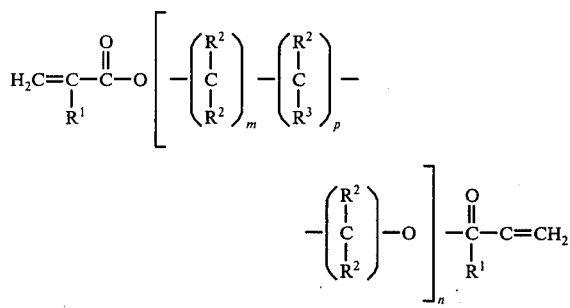

wherein $R^2$ represents a radical selected from the group consisting of hydrogen, lower alkyl of from 1 to about 4 carbon atoms, hydroxy alkyl of from 1 to about 4 carbon atoms, and

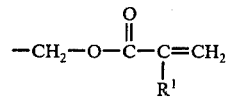

$R^1$ is a radical selected from the group consisting of hydrogen, halogen, and lower alkyl of from 1 to about 4 carbon atoms; $R^3$ is a radical selected from the group consisting of hydrogen, hydroxyl, and

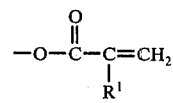

$m$ is an integer equal to at least 1, $n$ is an integer equal to at least 1, and $p$ is 0 or 1,
    (b) a free radical initiator in an amount sufficient to initiate polymerization of the monomer,
    (c) an accelerator, and
    (d) a nitrobenzene stabilizer having from zero to five substituent groups thereon, said groups being selected from chlorine, bromine and methyl, and from one to two nitro groups.

2. An anaerobic adhesive system according to claim 1, wherein the stabilizer is present in an amount ranging from 0.05 to 1.5 percent by weight.

3. An anaerobic adhesive system according to claim 2, wherein the nitrobenzene stabilizer is a chlorinated nitrobenzene having from one to five chlorine atoms.

4. An anaerobic adhesive system according to claim 2, wherein the nitrobenzene stabilizer is selected from the group consisting of nitrobenzene, pentachloronitrobenzene, 4-chloronitrobenzene, 2,3,5,6 tetrachloronitrobenzene.

5. An anaerobic adhesive system according to claim 2, wherein the stabilizer is present in the range of 0.1 to 1.0 weight percent.

6. An anaerobic adhesive system according to claim 2, wherein the stabilizer has one nitro group.

7. An anaerobic adhesive system according to claim 1, wherein the polyacrylate monomer is polyethylene glycol dimethacrylate.

* * * * *

UNITED STATES PATENT OFFICE
CERTIFICATE OF CORRECTION

Patent No. 4,103,081          Dated July 25, 1978

Inventor(s) Stephen Repetto

It is certified that error appears in the above-identified patent and that said Letters Patent are hereby corrected as shown below:

At Column 5, Line 6: Delete in the table, under the column 2hrs. - 52/254 and add 52/251

At Column 5, Line 8: Delete 56/253 and add 56/252.

Signed and Sealed this

Third Day of August 1982

[SEAL]

Attest:

Attesting Officer

GERALD J. MOSSINGHOFF

Commissioner of Patents and Trademarks